United States Patent [19]
Ikai et al.

[11] Patent Number: 5,942,027
[45] Date of Patent: Aug. 24, 1999

[54] INK FOR BALL POINT PEN

[75] Inventors: Takayuki Ikai, Yokohama; Misao Oyama, Tokyo, both of Japan

[73] Assignee: Mitsubishi Pencil Kabushiki Kaisha, Tokyo, Japan

[21] Appl. No.: 09/015,481

[22] Filed: Jan. 28, 1998

[30] Foreign Application Priority Data

Jan. 28, 1997 [JP] Japan ..................... 9-013757

[51] Int. Cl.$^6$ .................... C09D 11/18

[52] U.S. Cl. ..................... 106/31.33; 106/31.65

[58] Field of Search ............... 106/31.33, 31.65

[56] References Cited

U.S. PATENT DOCUMENTS

| | | | |
|---|---|---|---|
| 3,074,800 | 1/1963 | Germann | 106/31.33 |
| 4,462,832 | 7/1984 | Jettmar et al. | 106/31.65 |
| 5,221,332 | 6/1993 | Kohlmeier | 106/31.33 |
| 5,827,363 | 10/1998 | Darsillo et al. | 106/31.65 |

*Primary Examiner*—Helene Klemanski
*Attorney, Agent, or Firm*—Darby & Darby

[57] ABSTRACT

An ink for a ball point pen contains at least one or plural kinds of organic solvents, colorants and resins and further contains fine particle silica having a primary average particle diameter of 7 to 40 nm and a specific surface area (BET method) of 50 to 380 $m^2/g$. The ink for a ball point pen is prevented from leaking out of the pen tip, is not damaged smooth writing feeling and does not cause clogging at the pen tip.

3 Claims, No Drawings

INK FOR BALL POINT PEN

BACKGROUND OF THE INVENTION

1. Field of the Invention

The present invention relates to an ink for a ball point pen, specifically to an ink for a ball point pen which is prevented from leaking out of the pen tip and is not damaged smooth writing feeling and which does not cause clogging at the pen tip.

2. Description of the Related Art

Ball point pens filled with conventional inks having a viscosity of 5000 to 20000 mPa·s at 25° C. sometimes leak the inks from the pen tips when the ball point pens have been irradiated directly with sunlight to have the temperatures of the pen bodies elevated, or when the ball point pens have been left turning downward for long time. Ball point pens filled with inks having a low viscosity of 1000 to 5000 mPa·s at 25° C. show such tendency more markedly. Increasing the drying property of inks in order to stop leaking of the inks brings about the problems of deterioration in the writing feeling, starving at the beginning of writing and reduction in the shelf life.

Furthermore, inks leaking out of the pen tips of ball point pens stain hands and cloths or make it impossible to use the ball point pens in a certain case. Accordingly, it is the current situation to prevent inks from leaking by reducing clearance of tips, and thus the writing feeling tends to be deteriorated.

SUMMARY OF THE INVENTION

An object of the present invention is to solve the conventional problems described above and provide an ink for a ball point pen which is prevented from leaking out of the pen tip and is not damaged smooth writing feeling and which does not cause clogging at the pen tip.

The present inventors have investigated various additives for an ink for a ball point pen, and as a result, they have found that an ink for a ball point pen which is prevented from leaking out of the pen tip and is not damaged smooth writing feeling and which does not cause clogging at the pen tip can be obtained by adding silica having an average particle diameter and a specific surface area (BET method), each of which falls in a specific range, to an ink comprising at least one or plural kinds of organic solvents, colorants and resins, and thus have come to complete the present invention.

The ink of the present invention for a ball point pen is as described below in (1) to (3):

(1) An ink for a ball point pen comprising at least one or plural kinds of an organic solvents, colorants and resins and further comprising fine particle silica having a primary average particle diameter of 7 to 40 nm and a specific surface area (BET method) of 50 to 380 m$^2$/g.

(2) The ink for a ball point pen as described above in item (1), further comprising polyvinylpyrrolidone as an additive.

(3) The ink for a ball point pen as described above in item (1) or (2), wherein the ink has a viscosity of 1000 to 5000 mPa·s at 25° C.

DESCRIPTION OF THE PREFERRED EMBODIMENTS

The embodiments of the present invention shall be explained below in detail.

The ink of the present invention for a ball point pen is characterized by containing at least one or plural kinds of organic solvents, colorants and resins and further containing fine particle silica having a primary average particle diameter of 7 to 40 nm and a specific surface area (BET method) of 50 to 380 m$^2$/g.

The fine particle silica used in the present invention has a primary average particle diameter of 7 to 40 nm and a specific surface area (BET method) of 50 to 380 m$^2$/g, and the surface thereof may be hydrophilic or hydrophobic.

The object of the present invention can be achieved by using fine particle silica having a primary average particle diameter and a specific surface area (BET method) each of which falls in the specific range described above, respectively. However, the object of the present invention can not be achieved by using silica having a primary average particle diameter and a specific surface area each of which falls outside of the range described above, respectively, and therefore it is not preferable.

If the content of silica is less than 0.01% by weight relative to the whole amount of the ink, much effect is not expected. If said content is more than 2.5% by weight relative to the whole amount of the ink, then the viscosity of the ink gets higher. Accordingly, it is preferably 0.01 to 2.5% by weight, more effectively 0.03 to 2.0% by weight and further more effectively 0.05 to 1.0% by weight relative to the whole amount of the ink.

All of known dyes and/or pigments used for conventional ball point pen inks can be used as a colorant used in the present invention.

The dyes include, dyes which are soluble in the solvents used, such as Balifast Color (brand name, manufactured by Orient Chemical Ind. Co., Ltd.), and Aizen Spiron dye and Aizen SOT dye (brand names, manufactured by Hodogaya Chemical Ind. Co., Ltd.).

Furthermore, the pigments include inorganic pigments such as titanium oxide, carbon black and metal powder, and organic pigments such as azo lakes, insoluble azo pigments, chelate azo pigments, phthalocyanine pigments, perylene pigments, anthraquinone pigments, quinacridone pigments, dye lakes, nitro pigments and nitroso pigments.

These colorants may be used alone or in a mixture of two or more kinds thereof, and the dyes and the pigments may be used in combination.

The content of the colorant falls preferably in a range of 5 to 50% by weight relative to the whole amount of the ink.

Organic solvents used in the present invention are solvents used for ordinary ball point pen inks, that is, those dissolving or dispersing the colorants described above and having relatively high boiling points.

Such organic solvents include, for example, benzyl alcohol, phenoxyethanol, carbitols and cellosolves. They may be used alone or in a mixture of two or more kinds thereof.

The content thereof falls preferably in a range of 20 to 70% by weight relative to the whole amount of the ink.

The resin used in the present invention is added for adjusting the viscosity of the ink. Used are resins used for conventional ball point pen ink, for example, ketone resins, sulfonamide resins, maleic resins, ester gums, xylene resins, alkyd resins, phenol resins and rosin resins. These resins may be used alone or in a mixture of two or more kinds thereof.

The content thereof falls preferably in a range of 1 to 40% by weight relative to the whole amount of the ink.

In the present invention, polyvinylpyrrolidone is preferably added as an additive in order to disperse more effectively the fine particle silica described above. The content thereof falls preferably in a range of 0.01 to 10.0% by weight relative to the whole amount of the ink. The effective content is different depending on the relation of the amount of the added fine particle silica to the weight-average molecular weight of polyvinylpyrrolidone and the viscosity of the resulting ink.

To be specific, polyvinylpyrrolidone includes PVP (manufactured by ISP Co., Ltd.) and Lubiscol (manufactured by BASF Co., Ltd.).

The ink of the present invention for a ball point pen can contain additives used for conventional inks for ball point pens, for example, surfactants, fungicides and lubricants in addition to the components described above.

The viscosity of the ink of the present invention for a ball point pen shall not specifically be restricted but falls preferably in a range of 1000 to 5000 mPa·s at 25° C. This viscosity range, i.e. that for the low viscosity ink for a ball point pen, makes it possible to prevent the ink from leaking out of the pen tip, improve the writing performance and cause no clogging at the pen tip.

In the present invention, the ink for a ball point pen which is prevented from leaking out of the pen tip and is not damaged smooth writing feeling and which does not cause clogging at the pen tip can be obtained by allowing the ink to contain fine particle silica having a primary average particle diameter of 7 to 40 nm and a specific surface area (BET method) of 50 to 380 $m^2/g$. A mechanism to prevent leaking is not made distinctly clear, and it is presumed that silanol groups (SiOH) present on the surface of the silica fine particles are combined with each other by virtue of a hydrogen bond while being left in a static state and this bond elevates the viscosity so as to form the network structure, whereby the ink is prevented from leaking out of the pen tip.

It is presumed that polyvinylpyrrolidone makes more effectively form the network structure described above which is broken very easily by applying shearing force. This causes no problem in smoothness of writing and no clogging at the pen tip.

Furthermore, the addition of polyvinylpyrrolidone provides the ink for a ball point pen with spinnability and is effective for preventing blobbing of the ink at the time of writing.

EXAMPLES

The present invention shall be explained below in detail with reference to examples and comparative examples. However, the present invention shall not be restricted to the following examples.

Example 1

| Dyes: | Balifast Black #1802 (manufactured by Orient Chemical,Co., Ltd.) | 20.0% by weight |
| --- | --- | --- |
| | Spiron Violet C-RH (manufactured by Hodogaya Chemical Co., Ltd.) | 10.0% by weight |
| | Balifast Yellow 1105 (manufactured by Orient Chemical Co., Ltd.) | 5.0% by weight |
| Solvents: | phenoxyethanol | 37.0% by weight |
| | benzyl alcohol | 10.0% by weight |
| Resin: | ketone resin (Hilack 111 manufactured by Hitachi Chemical Co., Ltd.) | 8.0% by weight |

-continued

| Lubricant: | oleic acid | 5.0% by weight |
| --- | --- | --- |
| Additive: | polyvinylpyrrolidone (Lubiscol K-90 manufactured by BASF CO., Ltd.) | 4.0% by weight |
| Silica: | Aerosil R812 (manufactured by Nippon Aerosil Co., Ltd.) (primary average particle diameter: 7 nm, specific surface area (BET method): 260 $m^2/g$) | 1.0% by weight |

These materials were put into a stirrer and stirred at 60° C. for 8 hours. Then, after silica had been sufficiently dispersed with three rolls, the mixture was filtered to obtain an ink for a ball point pen.

Example 2

| Dyes: | Spiron Black GMH (manufactured by Hodogaya Chemical, Co., Ltd.) | 15.0% by weight |
| --- | --- | --- |
| | Spiron Violet C-RH (manufactured by Hodogaya Chemical Co., Ltd.) | 10.0% by weight |
| | Balifast Yellow AUM (manufactured by Orient Chemical Co., Ltd.) | 5.0% by weight |
| Solvents: | phenoxyethanol | 44.0% by weight |
| | benzyl alcohol | 10.0% by weight |
| Resin: | ketone resin (Hilack 110H manufactured by Hitachi Chemical Co., Ltd.) | 8.0% by weight |
| Lubricant: | oleic acid | 3.0% by weight |
| Additive: | polyvinylpyrrolidone (PVP K-15 manufactured by ISP CO., Ltd.) | 4.0% by weight |
| Silica: | Aerosil #200 (manufactured by Nippon Aerosil Co., Ltd.) (primary average particle diameter: 12 nm, specific surface area (BET method): 200 $m^2/g$) | 1.0% by weight |

These materials were put into a stirrer and stirred at 60° C. for 8 hours. Then, after silica had been sufficiently dispersed with three rolls, the mixture was filtered to obtain an ink for a ball point pen.

Example 3

| Dyes: | Spiron Blue #26 (manufactured by Hodogaya Chemical Co., Ltd.) | 15.0% by weight |
| --- | --- | --- |
| | Spiron Blue C-RH (manufactured by Hodogaya Chemical Co., Ltd.) | 9.0% by weight |
| | Spiron Violet C-RH (manufactured by Hodogaya Chemical Co., Ltd.) | 6.0% by weight |
| Solvents: | phenoxyethanol | 44.5% by weight |
| | benzyl alcohol | 10.0% by weight |
| Resin: | ketone resin (Hilack 111 manufactured by Hitachi Chemical Co., Ltd.) | 10.0% by weight |
| Lubricant: | oleic acid | 3.0% by weight |
| Additive: | polyvinylpyrrolidone (PVP K-30 manufactured by ISP CO., Ltd.) | 2.0% by weight |

-continued

| Silica: | Aerosil #380 (manufactured by Nippon Aerosil Co., Ltd.) (primary average particle diameter: 7 nm, specific surface area (BET method): 380 m²/g) | 0.5% by weight |
|---|---|---|

These materials were put into a stirrer and stirred at 60° C. for 8 hours. Then, after silica had been sufficiently dispersed with three rolls, the mixture was filtered to obtain an ink for a ball point pen.

Example 4

| Dyes: | Balifast Blue 1603 (manufactured by Orient Chemical Co., Ltd.) | 15.0% by weight |
|---|---|---|
| | Sabiniel Blue GLS (manufactured by SANDOZ Co., Ltd.) | 15.0% by weight |
| Solvents: | phenoxyethanol | 42.4% by weight |
| | benzyl alcohol | 15.0% by weight |
| Resin: | ketone resin K90 manufactured by Arakawa Chemical Ind. Co., Ltd.) | 9.0% by weight |
| Lubricant: | oleic acid | 3.0% by weight |
| Additive: | polyvinylpyrrolidone (PVPK-90 manufactured by ISP CO., Ltd.) | 0.5% by weight |
| Silica: | Aerosil #50 (manufactured by Nippori Aerosil Co., Ltd.) (primary average particle diameter: 40 nm, specific surface area (BET method): 50 m²g) | 0.1% by weight |

These materials were put into a stirrer and stirred at 60° C. for 8 hours. Then, after silica had been sufficiently dispersed with three rolls, the mixture was filtered to obtain an ink for a ball point pen.

Example 5

| Dyes: | Spiron Red C-BH (manufactured by Hodogaya Chemical CO., Ltd.) | 4.00% by weight |
|---|---|---|
| | Spiron Red C-GH (manufactured by Hodogaya Chemical Co., Ltd.) | 4.00% by weight |
| | SPT Orange 6 (manufactured by Hodogaya Chemical Co., Ltd.) | 15.00% by weight |
| Solvents: | phenoxyethanol | 45.95% by weight |
| | benzyl alcohol | 15.00% by weight |
| Resin: | ketone resin K90 (manufactured by Arakawa Chemical Ind. Co., Ltd.) | 12.00% by weight |
| Lubricant: | oleic acid | 3.00% by weight |
| Additive: | polyvinylpyrrolidone (PVP K-15 manufactured by ISP CO., Ltd.) | 1.00% by weight |
| Silica: | Aerosil R974 (manufactured by Nippon Aerosil Co., Ltd.) (primary:average particle diameter: 12 nm, specific surface area (BET method): 170 m²/g) | 0.05% by weight |

These materials were put into a stirrer and stirred at 60° C. for 8 hours. Then, after silica had been sufficiently dispersed with three rolls, the mixture was filtered to obtain an ink for a ball point pen.

Example 6

| Dyes: | Spiron Red C-BH (manufactured by Hodogaya Chemical Co., Ltd.) | 4.0% by weight |
|---|---|---|
| | Spiron Red. C-GH (manufactured by Hodogaya Chemical Co., Ltd.) | 21.0% by weight |
| Solvents: | phenoxyethanol | 44.0% by weight |
| | benzyl alcohol | 15.0% by weight |
| Resin: | ketone resin (Hilack #111 manufactured by Hitachi Chemical Co., Ltd.) | 12.0% by weight |
| Lubricant: | oleic acid | 3.0% by weight |
| Additive: | polyvinylpyrrolidone (Lubiscol K-30 manufactured by BASF CO., Ltd.) | 0.5% by weight |
| Silica: | Aerosil #300 (manufactured by Nippon Aerosil Co., Ltd.) (primary average particle diameter: 7 nm, specific surface area (BET method): 300 m²g) | 0.5% by weight |

These materials were put into a stirrer and stirred at 60° C. for 8 hours. Then, after silica had been sufficiently dispersed with three rolls, the mixture was filtered to obtain an ink for a ball point pen.

The inks for a ball point pen obtained in Examples 1 to 6 described above were measured by an EH type viscometer to find that all viscosities fell in a range of 1000 to 5000 mPa·s.

Comparative Examples 1 to 6

The inks of various colors were prepared in the same manner as in Examples 1 to 6, except that silica (Aerosil) and the additive (polyvinylpyrrolidone) were removed from Examples 1 to 6 and the shortage thereof was made up by phenyl glycol.

The inks obtained in Examples 1 to 6 and Comparative Examples 1 to 6 described above were filled respectively into a ball point pen equipped with a stainless steel tip to subject them to the tests of ink leakage and writing performance. They were measured by the following methods.

Ink Leakage:

A ball point pen for testing was used for trial writing and then left for standing under the following conditions with a pen tip turning downward condition (A): temperature of 50° C. and humidity of 80% for 7 days, and condition (B): temperature of 25° C. and humidity of 60% for 7 days, to judge the amount of the ink leaking out of the pen tip according to the following criteria. The data is the most frequent value among ten samples.

◯: ink leakage is not observed at all

●: very small amount of ink leakage is observed at the pen tip

Δ: medium amount of ink leakage is observed at the pen tip

▲: large amount of ink leakage is observed at the pen tip

X: ink leaks and drops

Writing Performance:

A ball point pen for testing was used for writing on paper with a free hand to judge smoothness and lightness in writing feeling according to the following criteria.

◯: very smooth and light writing feeling

●: smooth and light writing feeling

Δ: writing feeling slightly short of smoothness and lightness
▲: slightly bad writing feeling
X: very bad writing feeling

TABLE 1

|  | Ink leaking amount | | Writing performance |
|---|---|---|---|
|  | Condition (A) | Condition (B) |  |
| Example 1 | ○ | ○ | ● |
| 2 | ● | ○ | ○ |
| 3 | ● | ● | ● |
| 4 | ● | ● | ○ |
| 5 | ○ | ● | ○ |
| 6 | ○ | ○ | ● |
| Comparative |  |  |  |
| Example 1 | ▲ | ▲ | ● |
| 2 | X | ▲ | ○ |
| 3 | ▲ | X | ● |
| 4 | X | ▲ | ○ |
| 5 | ▲ | X | ○ |
| 6 | ▲ | X | ● |

As obvious from the results shown in Table 1 described above, it has been confirmed that Examples 1 to 6 falling within the scope of the present invention cause only small ink leakage and provide a good writing performance as compared with Comparative Examples 1 to 6 falling outside the scope of the present invention.

What is claimed is:

1. An ink for a ball point pen comprising at least one or plural kinds of organic solvents, colorants and resins and further comprising fine particle silica having a primary average particle diameter of 7 to 40 nm and a specific surface area (BET method) of 50 to 380 m²/g.

2. The ink for a ball point pen as described in claim 1, comprising polyvinylpyrrolidone as an additive.

3. The ink for a ball point pen as described in claim 1, wherein the ink has a viscosity of 1000 to 5000 mPa·s at 25° C.

* * * * *